United States Patent [19]

Bost

[11] 4,445,709
[45] May 1, 1984

[54] THREE-POINT SAFETY BELT SYSTEM

[76] Inventor: Alois Bost, Leopoldstr. 102, D-6685 Schiffweiler 2, Fed. Rep. of Germany

[21] Appl. No.: 448,606

[22] Filed: Dec. 10, 1982

Related U.S. Application Data

[63] Continuation-in-part of Ser. No. 393,770, Jun. 30, 1982.

[30] Foreign Application Priority Data

Apr. 27, 1982 [DE] Fed. Rep. of Germany ....... 3215634

[51] Int. Cl.$^3$ ............................................. A62B 35/00
[52] U.S. Cl. .................................... 280/801; 297/483
[58] Field of Search ............... 280/801, 802, 805, 806, 280/807, 808; 297/468, 482, 483; 410/96, 97, 100

[56] References Cited

U.S. PATENT DOCUMENTS 3,982,769 9/1976 Färlind ................................ 297/483
4,180,283 12/1979 Ziv ...................................... 280/808
4,243,266 1/1981 Anderson ............................ 297/468

Primary Examiner—Joseph F. Peters, Jr.
Assistant Examiner—Ross Weaver
Attorney, Agent, or Firm—Armstrong, Nikaido, Marmelstein & Kubovcik

[57] ABSTRACT

In a safety belt system with a belt takeup pulley and a belt runner in which the belt is threaded, the runner has a cross-bar marking the ends, joined together, of the lengths of belt stretched across the user's hips and (slopingly) across his chest. In order to make certain that there is no chance of the size of two such belt lengths being changed by chance while driving or, more specially, stopping any such change in lengths taking place on a smash-up, the belt runner has a part acting as a locking member in the form of a guidepiece having two eyes placed on the two sides of the cross-bar of the runner and having the belt threaded through them. After pulling the belt tight, it is stopped from being moved by the guidepiece, the belt being gripped upon over its full breadth. Furthermore, the guidepiece, in the case of a preferred working example of the invention, has a reinforcement facing the belt having the function of a fulcrum as a guidepiece on the one hand and on the other acting as a further gripping jaw. The guidepiece also has a projection extending across the width thereof which engages the runner to limit the relative movement of the guidepiece and the runner. As part of a specially preferred form of the invention, the guidepiece has a handle making it possible for the guidepiece to be turned in relation to the cross-bar so that, after putting on the belt, the lengths of the parts of the belt running across the hips and chest may be changed.

19 Claims, 10 Drawing Figures

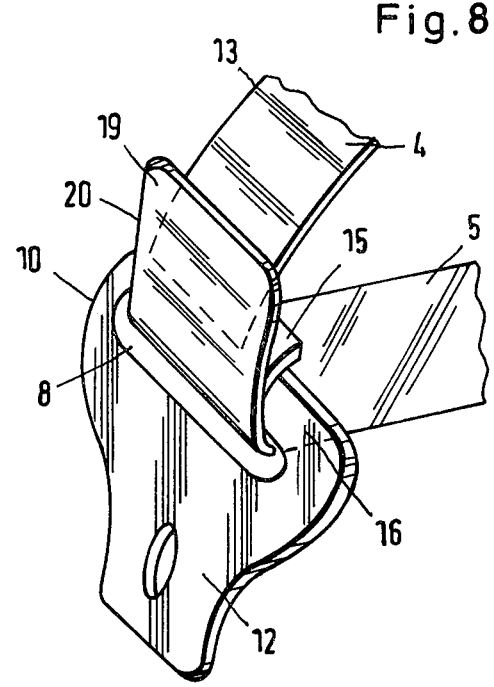
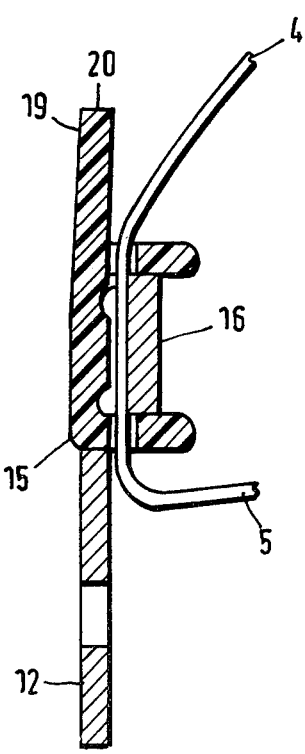
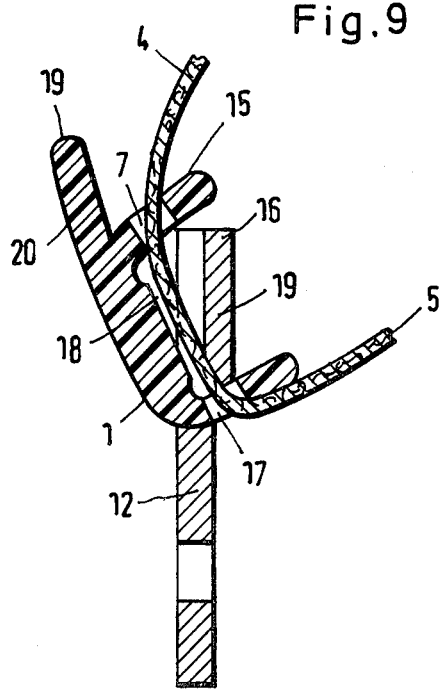

THREE-POINT SAFETY BELT SYSTEM

RELATED APPLICATION

This application is a Continuation-In-Part of my co-pending Application Ser. No. 393,770, filed June 30, 1982.

BACKGROUND OF THE INVENTION

The present invention is with respect to a three-point safety belt system having a belt takeup pulley, a belt runner with an eye with the belt running through it next to a cross-bar of the runner which is at a point where two lengths of the belt trained in the one case across the hips or pelvis of the user and in the other case, across his or her chest, come together, the runner being designed to keep the chest and hip lengths of the belt in their desired position and at their desired adjustment.

Such a safety belt system has been put forward at an earlier date by the present inventor (see German Pat. No. 2,552,016), using a buckle-like bar, as a separate part, in front of the eye of the belt runner for keeping the two said lengths across the chest and across the hips in their desired position. In two further developments of the invention (the German Offenlegungsschrift specifications Nos. 2,906,540 and 2,927,396) steps were to be taken for stopping, more specifically, damage to the belt by such a buckle system while on the other hand, making certain that no change in size of the two lengths of the belt were possible, that is to say, once the belt had been put on and the adjustment made in the length in the first place.

GENERAL OUTLINE OF THE INVENTION

It is the primary object of the present invention to provide a three-point safety belt system of the sort noted which makes certain that at the time of driving the motorvehicle, the belt is strongly kept in position at the vehicle's seat, while on the other hand, for increasing the driving comfort, adjustment of the two lengths of the belt is possible by hand.

For effecting this purpose, and further purposes, for stopping any changes in the sizes of the two lengths of the belt, use is made of a guidepiece seated on and round a cross-bar of the runner, the guidepiece having two eyes through which the belt is threaded, the two eyes being on the two sides of the cross-bar. The guidepiece includes a projection which contacts the runner to prevent too strong of a holding of the belt, while furthermore, the guidepiece has a handle making it possible for the guidepiece to be turned or angled in relation to the cross-bar.

As part of a preferred working example of the invention, the guidepiece is in the form of a gripping or locking part which is automatically turned on the cross-bar, and more specially, the guidepiece is loosely kept in position by the belt itself on the cross-bar. The two guidepiece eyes or belt openings may, more specially, be placed right on two sides of the cross-bar. A projection extends across the guidepiece, the projection being positioned between the eyes and parallel thereto.

As for further details of the design, the guidepiece may be so designed that it is generally saddle-like in cross-section, with its saddle back placed on the top of the cross-bar.

As part of one more specially preferred form of the invention, the guidepiece has a reinforcement, on the belt side of the guidepiece and used as a fulcrum. The guidepiece may be made of a synthetic resin or metal, synthetic resin being preferred because of the lesser weight.

To make it possible for the guidepiece to be put on the safety belt which has been fixed in a car beforehand, the eyes in the guidepiece may be such that they are not complete, that is to say, with openings therein so that the side of the belt may be threaded sideways into such opening and then worked into the eyes.

As a further detail of the invention, it is possible for the cross-bar of the runner to be placed in a plane which is out of the plane of the rest of the runner by an amount, more specially, of about 1 mm.

As part of a still further development of the invention, the eyes in the guidepieces are so spaced from a top edge of the guidepiece that when the belt is not pulled tight, and more specially, when it is being rolled up by the belt pulley, the belt may be taken up freely through the guidepiece eyes and run along the top side of the cross-bar, this making certain that the function of an automatic belt is readily able to take place even with the presence of the further safety system.

As part of a further preferred working example of the invention, the belt runner or locking part has a level higher up than the cross-bar, an U-like tailpiece which, when the safety belt is put on, is rested on the top side of the belt length stretching across the user's chest. The function of this tailpiece is that of making certain that turning and, for this reason, gripping on the belt may take place between the belt runner and the guidepiece.

The reinforcement may preferably have at least one gripping face for the hip length of the belt, the same being gripped over its full breadth and the belt hs been put on by the user.

In the invention, there is the useful effect, more specially and quite in addition to the simple cheap way of producing it, that the chest length and the hip lengths of the belt are quite positively or safely fixed in position without being too tightly held. It is more specially in the case of the hip length that there is no chance of any change taking place while driving, the pelvic part of the driver's body will be kept back in the seat without any chance of undesired motion. Because the two lengths of the belt are fixed at the point where they come together, that is to say, between the chest and hip length of the belt, there is the specially useful effect that the belt takeup pulley does not have to keep on taking up belt length as the driver keeps on moving while driving. For this reason, the working life of such a belt takeup pulley may be coupled upon as being much longer.

A further useful effect to be specially noted that because of the handle, it is readily possible for the belt-user to make an adjustment of the two lengths of the belt in relation to the belt runner at any time while driving, such adjustment being necessary because, for example, the hip length of the belt was overly tight when the belt was first put on. Furthermore, when the position of the seat of the driver or a front seat passenger, it is very simple to make a change in the relative lengths of the two parts of the belt.

LIST OF FIGURES AND DETAILED ACCOUNT OF WORKING EXAMPLES OF THE PRESENT INVENTION

A detailed account will now be given of the invention using working examples to be seen in the figures.

FIG. 8 is a view, generally on the same lines as in FIG. 2, of a somewhat changed and more specially preferred form of the invention.

FIG. 9 is a section of the working example of FIG. 8 in which the belt is gripped and the two lengths thereof fixed.

FIG. 10 is a view on the same lines as in FIG. 9 in which the belt is loose and able to be slipped freely through the runner.

Figure 1:
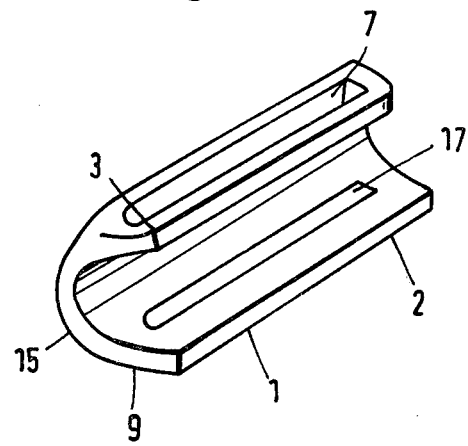
FIG. 1 is a perspective view of a first working example of the guidepiece for a three-point safety belt system of the present invention.

In a first example of the invention, the guidepiece 15 used with the safety belt system will be seen in FIG. 1, which it clear that the guidepiece 15 is in the form of a generally saddle-like guide body 1 having a saddle back and two saddle sides with lower edges 2 and 3. In these saddle sides there are slot-like eyes 7 and 17 running parallel to lower edges 2 and 3. The guide body also includes a projection 21 which is parallel to the edges 2 and 3. Guide body 1 may be made of synthetic resin or metal, synthetic resin being best because of its lower weight and the lesser chance of its doing damage to the material of the belt. As will be seen from the account now to be given, the guide body 1 is hardly acted upon by any strains so that it may be made of any light material.

Figure 2:
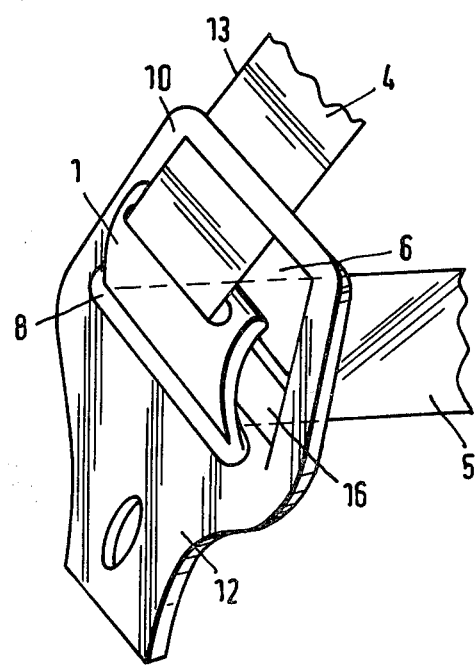
FIG. 2 is a perspective view of the belt runner or locking part with the guidepiece to be seen in FIG. 1.

As will be seen from the view of FIG. 2, the guide body 1 is so slipped onto the cross-bar 16 of the belt runner 2 or guide that the belt 13 is threaded through eyes 7 and 17 over the cross-bar 16 of belt runner 12, cross-bar 16 acting as a sort of fulcrum marking the connection point or limit between the chest length 4 and the hip or pelvic length 5 of the belt, the chest length 4 running at an angle across the user's chest while the pelvic length 5 is run across the user's hips. Belt 4 is threaded through a top eye 6 in the runner 12 from the back side of the same and then is threaded through a lower eye 8, which furthermore takes up the side 9 (of guide body 1) with the eye 17 therein, such belt then running back to the back side of the runner 12 as one end of the hip belt length 5.

Cross-bar 16 is, as part of a preferred working sample of the invention, bent out of the plane of the front side of the belt runner 12 backwards (see FIGS. 3 and 6 as well) by a distance, more specially, of 1 mm, that is to say, between the back side of the belt runner 12 and the front side of cross-bar 16. The general design is such in this case that when the belt is not pulled tight, more specially, when it is being rolled up by the belt takeup pulley (not shown), the belt 13 may be readily run through the eyes 7 and 17 on the top side of cross-bar 16.

In the working example of the belt runner, to be seen in FIG. 2, the upper eye 6, that is to say, on the top side of cross-bar 16, is limited by a U-like tailpiece 10 resting against the top side of belt 13, such tailpiece making it possible for the chest belt length 4 in effect to have the function of a trigger for causing motion of the guide body 1 in relation to the belt runner 12. The movement of the guide body 1 into the lower eye 8 of the belt runner is limited by the engagement of the projection 21 with the edge of lower eye 8.

The function of the three-point safety belt system to be seen in FIGS. 1 and 2 is such that, when the user puts on the safety belt, it is possible for hip length 5 of the belt to be pulled tight by pulling on the chest length 4 of the belt, the amount of the belt, which is then loose, being taken up by the belt takeup pulley. However, when the hip length 5 of the belt has been pulled tight, such length 5 is gripped by the lower eye 17 against cross-bar 16 along the full breadth of the belt. For this reason, the body of the driver is kept safely fixed on the seat. It will be seen from the figures that the part of the system formed by the guide body 1 is very simple and is, furthermore, a part which may be readily produced.

Figure 3:
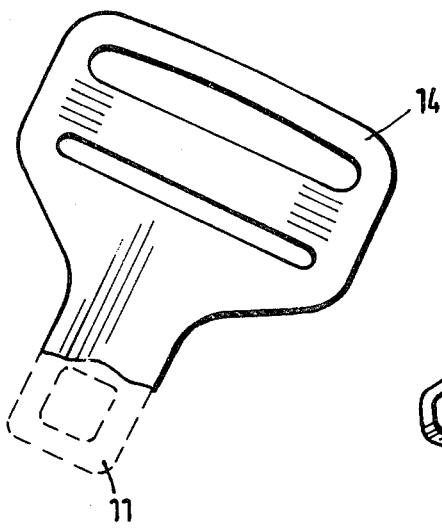
FIG. 3 is a plan view of one possible form of the belt runner.

FIG. 3 is a plan view of an other form of the belt runner 12, it being pointed out more specially that the part of the belt runner 12 marked in broken lines, that is to say, the male part 11 which is taken up in the lock of the saftey belt system, may have any desired form and like the outer edge 14, may have any desired form to be in line with the static strain and gripping effect coming into question.

Figure 4:
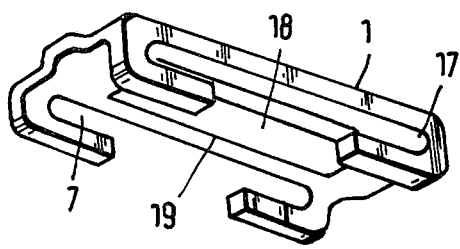
FIG. 4 is a perspective view of a somewhat changed form of the guidepiece.

In the perspective view of FIG. 4, another embodiment is shown of the guide body 1 in which eyes 7 and 17 are open to make it possible for such guide bodies to be used in safety belt systems which have been fixed in a motorvehicle at some earlier date.

Figure 5:
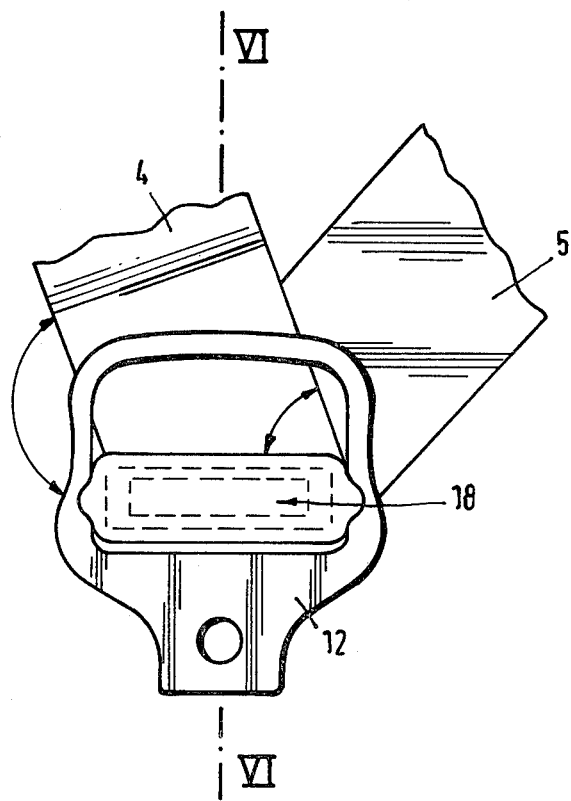
FIG. 5 is a plan view of a belt runner with the guidepiece of FIG. 4.
Figure 6:
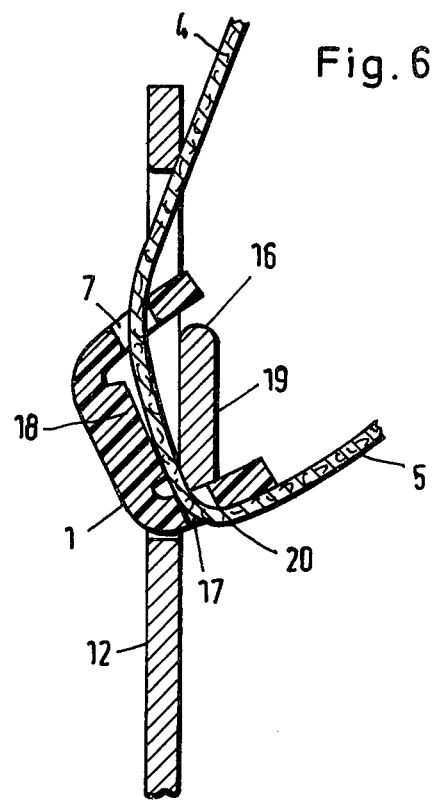
FIG. 6 is a section through a belt runner in the plane of the line VI—VI of FIG. 5, the guidepieces used, however, having eyes without any openings therein.
Figure 7:
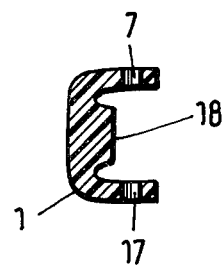
FIG. 7 is a section of the guidepiece of FIG. 6.

FIG. 4 is with respect to a very important detail of the invention which may be used in the working example of FIG. 1. As can be seen, the guide body 1 has, on its side turned towards belt 13, a reinforcement 18 having two functions. One function, as will be made clear in more detail using FIGS. 5 and 6, is that of a fulcrum at a given desired position for relative turning it of the belt runner 12 and the guide body 1 and furthermore, cross-bar 16 has a gripper edge 19 for powerfully gripping and keeping in position the hip length of the belt when turning takes place. This function will be seen more specially from FIGS. 5 and 6.

For strongly gripping the hip length 5 of belt in relation to the chest length 4, the hip length of the belt is changed in angle sideways in relation to the shoulder part of the belt when the belt is put on in the first place. Furthermore, and in addition (see more specially FIG. 6), the hip length of the belt is gripped in two parts over its full breadth, that is to say, at the angled part 20 in eye 17 and in addition, by the full breadth of belt 13 as such being forced by gripper edge 19 against crossbar 16. The swiveling of guide body 1 with respect to angle port 20 of cross-bar 16 is limited by projection 21, which engages the edge of the slot in runner 12.

The working examples of FIGS. 8, 9 and 10 are more specially preferred because it makes it specially simple for adjustment of the belt lengths to be undertaken in relation to each other, such adjustment being desired on the part of the user, for example, if the hip length 5 of the belt has been pulled overly tight on getting into the vehicle in the first place. With respect to other details, this working example of the invention is the same as the earlier ones so that parts having the same function are given the same part numbers. For details of this further design, attention is to be given to the earlier account.

In the working example of FIGS. 8, 9 and 10, the guidepiece 15 has a handle 19 which, in the present working examples, takes the form of a lever 20. Because, as we have seen, the preferred material for guidepiece 15 is synthetic resin, lever 20 may best be made in one piece with guidepiece 15.

FIG. 9 is a view on the same lines as FIG. 6, of the position of the guidepiece, in which the hip length 5 of the belt is gripped and fixed in relation to the chest length 4 of the belt.

FIG. 10 is a view of a position produced by pressing lightly on the handle 19 or lever 20 so that the belt may be freely slipped through the runner and guidepiece, this being a useful effect for adjustment or on putting on the belt in the first place.

Taking a general view, it will be seen that the invention is with respect to a belt runner having a simple part acting as a locking system in one direction. In other words, the apparatus does not have the effect of stopping any pulling tight of the belt but on the other hand, it has a complete locking effect for stopping the belt being moved loosely in the opposite direction and nevertheless, keeping hand-adjustment possible. In the case of a further form of the invention, not figured, the handle may be formed by way of side compression springs on guidepiece 15, which may be used for undoing the locking effect by hand.

All measures of the present invention to be seen in the present account, the claims and the figures, and all the useful effects thereof, together with details of the design and form may be important for the invention separately or when grouped together. More specially, the locking part or the guidepiece may be claimed as such in its function as a separate invention.

What is claimed is:

1. In a three-point motorvehicle safety belt apparatus having a belt, a belt takeup unit and a belt runner at which lengths of said belt running across the hips and across the chest of a belt user come together, said runner being designed for gripping onto said belt and keeping its position between said chest and hip lengths of said belt, the invention residing in that said runner has an eye through which said belt is threaded, and a cross-bar on one side of said eye, said apparatus furthermore, having a belt guidepiece, said belt guidepiece comprising two eyes through which said belt is threaded, the two guidepiece eyes being placed on two sides of said cross-bar, a projection means formed on said guidepiece parallel to said eyes, said projection means engaging said runner to limit the relative movement of said guidepiece with respect to said runner, said guidepiece having a handle by which it may be turned in relation to said cross-bar.

2. The safety belt apparatus as claimed in claim 1, wherein said guidepiece is in the form of an automatically turning gripping part.

3. The safety belt apparatus as claimed in claim 1, wherein said guidepiece is in the form of an automatically turning locking part.

4. The safety belt apparatus as claimed in claim 1, claim 2 or claim 3, wherein said guidepiece is loosely kept in position on said cross-bar by said belt.

5. The safety belt apparatus as claimed in claim 1, claim 2 or claim 3, wherein said eyes of said guidepiece are directly next to said cross-bar.

6. The safety belt apparatus as claimed in claim 1, claim 2 or claim 3, wherein said guidepiece is saddle-like with a saddle back resting generally on said cross-bar and two saddle side placed on two sides of said cross-bar.

7. The safety belt apparatus as claimed in claim 1, claim 2 or claim 3, wherein said guidepiece has a reinforcement facing said belt for fulcruming said guidepiece.

8. The safety belt apparatus as claimed in claim 1, claim 2 or claim 3, wherein said guidepiece is made of synthetic resin.

9. The safety belt apparatus as claimed in claim 1, claim 2 or claim 3, wherein said guidepiece is made of metal.

10. The safety belt apparatus as claimed in claim 1, claim 2 or claim 3, wherein said guidepiece eyes have openings therein so that said belt may be threaded sideways thereinto.

11. The safety belt apparatus as claimed in claim 1, wherein said cross-bar is placed out of line with the plane in which the major part of said runner is placed.

12. The safety belt apparatus as claimed in claim 11, wherein said cross-bar is placed in the plane spaced by about 1 mm from a plane in which a major part of the rest of said runner is placed.

13. The safety belt apparatus as claimed in claim 1, claim 2 or claim 3, wherein the guidepiece eyes are so spaced in relation to a top side of said guidepiece that when said belt is loosely trained over the body of said user, the hip belt may be pulled freely through said guidepiece eyes over said top side of said cross-bar.

14. The safety belt apparatus as claimed in claim 1, claim 2 or claim 3, wherein said runner has, a higher level than said cross-bar, a U-like tailpiece designed for resting on a top side of said chest length of said belt and said belt is in position on said user.

15. The safety belt apparatus as claimed in claim 1, claim 2 or claim 3, wherein said handle is in the form of a lever joined with said guidepiece.

16. The safety belt apparatus as claimed in claim 1, claim 2 or claim 3, wherein said handle is in the form of a lever made in one piece with said guidepiece.

17. The safety belt apparatus as claimed in claim 1, claim 2 or claim 3, wherein said handle is in the form of compression springs, placed on the guidepiece and able to be undone by hand.

18. In a three-point motorvehicle safety belt apparatus having a belt, a takeup unit and a belt runner at which lengths of said belt running across the hips and across the chest of a belt user come together, said runner being designed for gripping onto said belt and keeping its position between said chest and hip lengths of said belt, wherein said runner has an eye through which said belt is threaded, and a cross-bar on one side of said eye, said apparatus further including a belt guidepiece, said guidepiece comprising two eyes through which said belt is threaded, the two guidepiece eyes being placed on two sides of said crossbar, and a projection means formed on said guidepiece parallel to said eyes, said projection means engaging the edge of the eye of said runner to limit the relative movement of said guidepiece with respect to said runner, said guidepiece being supported so that it may be turned in relation to said cross-bar into different positions of angle.

19. The safety belt apparatus as claimed in claim 1 or claim 18, wherein said projection means extends over the entire width of said guidepiece.

* * * * *